Patented Dec. 14, 1937

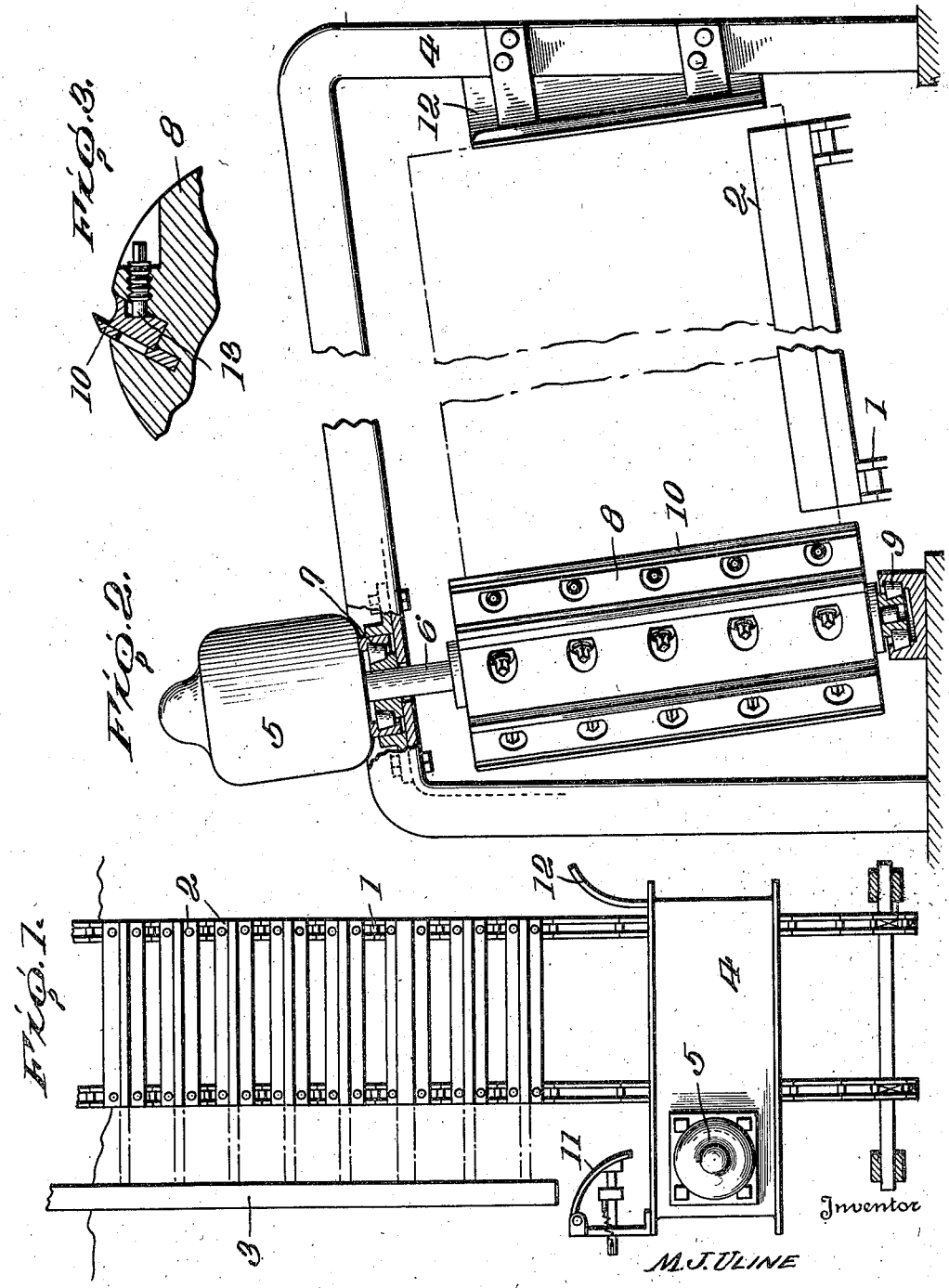

2,102,498

UNITED STATES PATENT OFFICE 2,102,498

MACHINE FOR SQUARING THE ENDS OF CAKES OF ICE

Migiel J. Uline, Washington, D. C.

Application November 25, 1935, Serial No. 51,527

3 Claims. (Cl. 125—13)

This invention relates to a machine for squaring the ends of cakes of ice and is a continuation in part of my application filed January 27, 1934, Serial Number 708,666, which has matured into Patent No. 2,058,744, issued October 27, 1936, the object being to provide a machine of this character in which a rotary cutting head is provided having a plurality of knives for gnawing off the white or snow end of a cake of ice in order to square the same.

The main object of my invention is to simplify the construction of machine and to provide a machine in which the ends can be squared very cheaply by a rotary cylindrical cutter.

Other and further objects and advantages of the invention will be hereinafter set forth and the novel features thereof defined in the appended claims.

In the drawing,

Figure 1 is a top plan view showing the application of my improved construction of cutting machine for cutting off the rough or white end of a cake of ice as it is moved through the same on a conveyor;

Figure 2 is an elevation showing the position of the cutter in respect to the conveyor; and Figure 3 is a detail section through the cutter head showing the means for securing the cutter therein.

In the drawing, 1 indicates an endless conveyor which is arranged on an incline as shown in Figure 2 and is provided with a plurality of cleats 2, arranged in sets, preferably to hold sixteen cakes of ice.

Arranged to one side of the conveyor at the point where the ice is placed on the conveyor from the ice cans is a bumper 3 against which the cakes of ice are held by gravity so as to allow these cakes of ice to travel freely with the conveyor.

The construction of conveyor is disclosed in my prior application and arranged over the conveyor at one end is a substantially inverted U-shaped frame 4 formed of channel iron. Mounted on the top of the inverted U-shaped frame is an electric motor 5 provided with a driving shaft 6 preferably mounted in roller bearings 7 and carrying a cutter head 8 cylindrical in form, the lower end of the shaft 6 being mounted in a roller bearing 9, said cutter head being provided with a plurality of knives 10 which are preferably arranged tangentially.

These cutter knives are adapted to engage the end of the cake of ice and gnaw off the ends of the same in order to break it up and cut it up into small pieces so that it can be used for cooling the water employed for freezing the ice. The cutter head is preferably rotated in the direction of travel of the material to be operated upon so as to carry the chips of ice away from the cutters and the material being operated upon.

While I have shown a motor shaft 6 formed continuous and having the cutter head mounted thereon, it is, of course, understood that the cutter head could be carried by a separate shaft and connected to the motor shaft by a coupling.

By having the cylindrical cutter arranged at an angle to the horizontal, the face of the cutter is at right angles to the cakes of ice on the inclined conveyor so as to square the cakes properly when they travel through the machine.

Arranged in advance of the U-shaped frame at one side is a yieldable guide 11 and at the opposite side a fixed guide 12, which are engaged by the cakes of ice as they move on the conveyor so as to bring the cakes of ice into engagement with the cylindrical cutter as it moves on the conveyor, these guides holding the cake of ice in its proper position on the conveyor so that the end of the cake of ice can be gnawed off as its passes under the frame to remove the snow or white end therefrom. The small pieces or chips of ice gnawed off the end of the cake are deposited in a tank in which is a coil through which passes the water used to freeze the cakes of ice.

In the drawing I have shown the blades 10 preferably arranged tangentially and secured in position by fastening means 13, but I do not wish to limit myself to the use of any particular construction of blade and fastening means so long as a cylindrical head is employed with a plurality of radially extending blades to gnaw the cake of ice off as it passes through the machine.

This is a continuation in part of my application, Serial Number 708,666, filed January 27, 1934, which has matured into Patent No. 2,058,744, issued October 27, 1936, and consists in utilizing a rotary cylindrical cutter for gnawing off the ends of the ice and I wish it to be clearly understood that while I have failed to show the entire ice plant as disclosed in the above referred to application, this type of cutter head can be substituted for the type of cutter head disclosed in the above referred to application without departing from the spirit of my invention and therefore I reserve the right to use this type of cutter head in connection with an ice plant as disclosed.

What I claim is:

1. In a machine for squaring the ends of cakes of ice, an endless conveyor provided with means for supporting and holding the cakes of ice on edge, said conveyor being arranged at an angle, a bumper arranged to one side of said conveyor, a frame bridging said conveyor, an obliquely arranged cylindrical cutter mounted in said frame and means for guiding the cake of ice on said conveyor in engagement with said cutter for gnawing off the end of the cake of ice.

2. In a machine for squaring the ends of a cake of ice, an endless conveyor provided with means for supporting and holding cakes of ice on edge, said conveyor being transversely inclined, a bumper arranged to one side of said conveyor, a frame bridging said conveyor, an electric motor carried by said frame provided with a driving shaft, a cylindrical cutter provided with a plurality of cutting knives mounted on said shaft and adapted to gnaw off the ends of the cake of ice as said cake passes said cutter and means for guiding the cake of ice in engagement with said cutter.

3. In a machine for squaring the ends of a cake of ice, an endless conveyor provided with means for supporting and holding cakes of ice on edge, said conveyor being arranged on a transverse incline, a frame bridging said conveyor, a cylindrical cutter head arranged obliquely within said frame having a plurality of tangentially arranged cutting knives and an electric motor for revolving said head in the direction of travel of said cakes of ice.

MIGIEL J. ULINE.